United States Patent Office 3,375,307
Patented Mar. 26, 1968

3,375,307
PROCESS FOR THE FABRICATION OF FUEL ELEMENTS FOR NUCLEAR REACTORS
Pierre Blum, Grenoble, Claude Moreau, Seyssinet-Pariset, and Louis Bochirol, Grenoble, France, assignors to Commissariat à l'Energie Atomique, Paris, France
No Drawing. Filed Jan. 17, 1966, Ser. No. 520,879
Claims priority, application France, Jan. 21, 1965, 2,841
2 Claims. (Cl. 264—.5)

This invention is directed to the preparation of fuel elements of spherical shape which are intended for use in high-temperature gas-cooled reactors and more especially of the so-called "pebble bed" type.

The fuel elements which are intended for this type of reactor usually consist of graphite balls which are rendered impermeable as a result of a number of successive impregnations. Said graphite balls each enclose a kernel of more or less substantial volume containing refractory fuel dispersed in a powdered graphite matrix which is strengthened by binders such as coal tar pitch, natural or synthetic resins and which is then subjected to a calcination process.

The graphite matrix must afford good thermal conductivity in order that excessive heating at the centers of the balls should be prevented as far as possible. The matrix must also endow the complete fuel element with sufficient mechanical strength and imperviousness to gaseous fission products which are liable to contaminate the coolant gas.

Moreover, it is highly desirable to ensure that, after depletion of the fuel element, the fuel can be recovered with the exception of the impregnated graphite jacket. The removal of this jacket by oxidizing combustion at high temperature has posed up to the present time very difficult problems which have not yet been solved in a satisfactory manner.

The fuel element as proposed by this invention for use in nuclear reactors of the "pebble bed" type is designed to overcome the disadvantages noted above and is both simple and rapid to prepare.

The method of manufacture of this fuel element entails the successive steps which consist in preparing a fuel kernel by molding a plastic paste obtained by adding to a powder of refractory material a binder which is chemically compatible with the refractory material, in shaping and drying the paste, in impregnating said fuel kernel with gaseous hydrocarbons at a temperature within the range of 800 to 1000° C., in applying over said fuel kernel a coating of graphite paste which is prepared in the same manner as the fuel kernel paste, in impregnating said coating with gaseous hydrocarbons at a temperature within the range of 800 to 1000° C., in inserting said coated fuel kernel within a recess having a shape which is identical with that of the kernel and formed in a graphite ball.

In order to fabricate the fuel kernel, a molding paste is prepared from a powder of refractory fuel having a particle size which is generally comprised between 100 and 400$\mu$, said powder being intended to receive an addition of powdered graphite and a binder which is chemically compatible with the refractory material and which has high swelling power in contact with water and low coking efficiency. The binder is selected from the following products as considered either separately or in combination: polysaccharides, gums, mucilages, starches, alginates which are dispersed in water. The proportion of binder does not exceed 5%, as expressed with respect to the total weight of dry material with which said binder is incorporated.

In the case of hydrolyzable materials such as the carbides and nitrides of uranium, drying oils are utilized as binder. Such oils may, for example, be either linseed oil or Chinese wood oil (tung oil) which is usually pre-thickened by blowing of hot air. Use can also be made of ethylcellulose dissolved in a volatile solvent such as ortho-dichlorobenzene, benzene and toluene.

The paste which is thus prepared is then subjected to a shaping process which is usually carried out in the cold state either by compression-molding or extrusion. The shaped products are then dried either in free air at room temperature or within a chamber at a temperature which is lower than 100° C.

The fuel kernel which is thus formed is rendered impermeable by being subjected to a thermal cracking of gaseous hydrocarbons, usually natural gas, at a temperature within the range of 800 to 1000° C. The fuel kernel is then coated with a layer of graphite by molding over the fuel kernel a paste which is prepared in precisely the same manner as the paste which served to form said kernel. After drying, the graphite coating is also subjected to a process of impregnation with hydrocarbons at a temperature within the range of 800 to 1000° C. This process ensures impermeability of said coating and forms a bond between this latter and the fuel kernel.

The preparation of a fuel kernel as hereinabove described has formed the subject of a patent application entitled "Process for the Fabrication of Fuel Elements Designed for High-Temperature Operation" as filed by the present applicant on Oct. 17, 1963. A fuel element as prepared by this method affords, among other properties, excellent impermeability, a crushing strength which is two and one-half times higher than that of a high-grade reactor graphite (approximately 500 kilograms per square centimeter).

According to an alternative form of the invention, the fuel kernel is made up of a cylindrical center portion obtained by molding a paste consisting of a mixture which is formed by mixing a graphite powder with one of the binding agents referred to above, the particle size of said powder being chosen so that the open porosity is of the order of 20 to 30% after impregnation with gaseous hydrocarbons, an intermediate layer formed of a paste which is applied over said center portion by molding, said paste being obtained by adding to a powder of refractory material a binding agent which is chemically compatible with said refractory material and being then impregnated with gaseous hydrocarbons, an outer graphite layer formed by applying over the intermediate layer a paste which is prepared in the same manner as the paste of the intermediate layer and which is impregnated with gaseous hydrocarbons.

By virtue of its open porosity, the center portion affords an available volume to the fission gases. Said open porosity must be in a proportion such that the fuel kernel still has high crushing strength, to an extent such that the ratio of crushing strength of the fuel kernel to the crushing strength of its jacket is at least equal to 1.5:1. The essential function of the outer layer is to protect the peripheral zone of the intermediate layer which contains the fuel. The annular arrangement of the fuel has the advantage of bringing the heat source closer to the surface of the fuel element, thus having the effect of reducing the maximum temperature which is reached for the same specific power rating while also improving fission product retention. Conversely, at equal temperature, the specific power of the fuel element can be appreciably increased.

The fuel element is slightly tapered or threaded and is then engaged within a recess of identical shape which is formed in a conventional ball of nuclear-grade graphite. Said fuel element can be even more securely fixed to the graphite jacket by bonding with a furfuryl resin, for example. After the plug has been fixed either by screwing or bonding, a baking process may then be carried out at moderate temperature in the event of utilization of a resin, and the fabrication of the fuel ball is then complete.

The excellent impermeability of the fuel kernel makes it unnecessary to ensure impermeability of the graphite ball in which said kernel is fitted, with the result that said ball can be utilized as it stands without further processing. The advantage of this feature from an economic standpoint can readily be appreciated.

The recovery of the fuel kernel is greatly facilitated. Inasmuch as the jacket of the fuel ball has a mechanical crushing strength which is substantially lower than that of the fuel kernel contained therein, it will therefore be merely necessary to apply a sufficiently high compressive force on the fuel ball, for example by means of a press, to result in fragmentation of the jacket and release of the kernel which remains intact for subsequent reprocessing. By virtue of the procedure as hereinabove described, approximately 90% of the carbonaceous materials which constitute the fuel element can be eliminated from the reprocessing cycle.

There now follow two examples of fabrication of a fuel element in accordance with the invention as designed for use in high-temperature reactors. The practical arrangements which will be described in connection with these examples must be considered as forming part of the invention, it being understood that any equivalent arrangements could equally well be employed without thereby departing from the scope of this invention.

Example 1

A cylindrical fuel kernel was prepared by molding a paste consisting of a mixture of graphite powder and spheroidal particles of 20% enriched uranium dioxide having a particle size of $200\mu$. The percentage by volume of $UO_2$ was 13.8%. After drying, the shaped paste was impregnated by cracking of natural gas for a period of 100 hours at 900° C.

The fuel kernel had the final shape of a cylinder 8 millimeters in diameter and 20 millimeters in height.

Said kernel was encased in a graphite jacket obtained by applying a paste having the following composition:

body material: nuclear-grade reactor graphite having a particle size within the range of 0 to $80\mu$.
binding agent: drying oil—20 parts.

The jacket which had an average thickness of 5 millimeters was first air-dried at 100° C. for a period of 48 hours. After being progressively brought to 500° C. in vacuo, said jacket was subjected to a treatment which consisted in impregnating with natural gas for a period of 300 hours at 900° C.

The fuel ball itself was 60 millimeters in diameter and machined from graphite of standard nuclear grade.

The fuel element was provided with a slight taper (1 to 2% conicity) and force-fitted within its recess at the center of the graphite ball.

The preparation of the fuel ball is completed by fitting a plug which is either screwed or bonded in position by means of a furfuryl resin. In the case of resin-bonding, the fuel element must additionally be heated to 900° C. for a period of a few hours.

Example 2

The fuel element as prepared according to the above procedure contained a cylindrical center portion 10 millimeters in diameter and 20 millimeters in height. Said center portion was obtained by molding a paste consisting of a mixture of powdered nuclear-grade graphite, a drying oil and a binder having a polysaccharide base. The graphite powder had a particle size of $300\mu$ and chosen so that, even after impregnation with gaseous hydrocarbons, open porosity is of the order of 20 to 30%.

An intermediate layer 3 millimeters thick consisting of a paste was applied by molding over said center portion, the body material of said paste being formed of a mixture of reactor graphite having a particle size within the range of 0 to $80\mu$ and spheroidal particles of 20% enriched $UO_2$ having a particle size of $200\mu$. The binder was linseed oil in a proportion of 20% by weight. Said intermediate layer was processed in natural gas for a period of 400 hours at 875° C. in order that the matrix thus obtained should be as impermeable as possible.

An outer jacket having the same thickness and the same composition but which did not contain uranium dioxide was applied in the same manner as the intermediate layer.

The fuel element was placed within a graphite ball as described in Example 1.

What we claim is:

1. Process for the fabrication of spherical fuel elements for use in high temperature reactors of the "pebble-bed" type, the steps of preparing a kernel of fuel by molding a plastic paste of a refractory combustible powder having a granular size between 100 and 400 microns mixed with a binder, drying the kernel, then depositing pyrolytic carbon in the pores of the kernel by cracking gaseous hydrocarbons therein at a temperature between 800° and 1000° C., whereby the kernel is rendered impermeable, then coating the kernel with a layer of graphite using a paste formed in the same way as the paste forming the kernel, then cracking gaseous hydrocarbons at a temperature between 800° and 1000° C. in the layer to deposit carbon in and render the layer impermeable, and then introducing the coated kernel into a recess in a graphite ball, the ratio of resistance to compression of the kernel and of the layer being at least equal to 1.5:1.

2. A process as described in claim 1, the kernel being a mixture of powdered graphite and a binder and having an open porosity between 20 and 30% after treatment by the gaseous hydrocarbons, the further step of applying to said kernel an intermediate layer of a paste of a refractory combustible powder and a chemical binder compatible with said refractory powder, then cracking gaseous hydrocarbons in said intermediate layer to deposit carbon in and to render said intermediate layer impermeable, then applying an external layer of graphite on said intermediate layer utilizing a paste obtained in identical manner to that forming the intermediate layer and then cracking gaseous hydrocarbons in said external layer to deposit carbon in and to render the external layer impermeable.

References Cited

UNITED STATES PATENTS

| | | | |
|---|---|---|---|
| 3,135,665 | 6/1964 | Koutz et al. | 176—91 |
| 3,158,547 | 11/1964 | Smith | 264—.5 |
| 3,164,487 | 1/1965 | Carley-Macauley et al. | 264—.5 |
| 3,166,614 | 1/1965 | Taylor | 264—.5 |
| 3,212,989 | 10/1965 | Fitzer et al. | 176—91 |
| 3,309,434 | 3/1967 | Blum et al. | 264—.5 |

L. DEWAYNE RUTLEDGE, *Primary Examiner.*